United States Patent
Max et al.

(10) Patent No.: US 11,310,330 B2
(45) Date of Patent: Apr. 19, 2022

(54) REQUESTING, ANALYZING AND TRANSMITTING DATA FROM DRIVER ASSISTANCE SYSTEMS ON A VEHICLE TO AN EXTERNAL USER

(71) Applicant: Volkswagen Aktiengesellschaft, Wolfsburg (DE)

(72) Inventors: Stephan Max, Gifhorn (DE); Roman Koch, Braunschweig (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 17/270,013

(22) PCT Filed: Jun. 26, 2019

(86) PCT No.: PCT/EP2019/066977
§ 371 (c)(1),
(2) Date: Feb. 20, 2021

(87) PCT Pub. No.: WO2020/043348
PCT Pub. Date: Mar. 5, 2020

(65) Prior Publication Data
US 2021/0329086 A1     Oct. 21, 2021

(30) Foreign Application Priority Data
Aug. 27, 2018 (DE) .................. 102018214452.4

(51) Int. Cl.
*H04L 29/08* (2006.01)
*H04L 67/568* (2022.01)
*H04L 67/12* (2022.01)

(52) U.S. Cl.
CPC .......... *H04L 67/2842* (2013.01); *H04L 67/12* (2013.01)

(58) Field of Classification Search
CPC .......................... H04L 67/2842; H04L 67/12
See application file for complete search history.

(56) References Cited

U.S. PATENT DOCUMENTS

| 2009/0150023 A1 | 6/2009 | Grau et al. |
| 2012/0257526 A1 | 10/2012 | Moeller et al. |

(Continued)

FOREIGN PATENT DOCUMENTS

| DE | 102005037913 A1 | 2/2007 |
| DE | 102013016554 A1 | 4/2015 |

(Continued)

OTHER PUBLICATIONS

PCT/EP2019/066977. International Search Report. (dated Sep. 26, 2019).

*Primary Examiner* — Kim T Nguyen
(74) *Attorney, Agent, or Firm* — Loza & Loza, LLP; Peter Zura

(57) ABSTRACT

Technologies and techniques for requesting, analyzing and transmitting data from driver assistance systems (DAS) on a vehicle to an external user. Sensors of the vehicle's DAS determine DAS data, and save the DAS data and summary in a vehicle-side swarm data aggregator. The summary of the DAS data may be transmitted to a swarm memory of an external backend computer, and an analysis device analyzes the summary of the DAS data. The analysis device requests the DAS data saved in the swarm data aggregator if the analysis of the summary shows that relevant DAS data is present in the swarm data aggregator. The DAS data is transmitted from the swarm data aggregator on the vehicle to the swarm memory of the backend computer on the basis of the request. The DAS data may then be transferred from the swarm memory to the external user for further use.

20 Claims, 1 Drawing Sheet

(56) References Cited

U.S. PATENT DOCUMENTS

Figure 1:
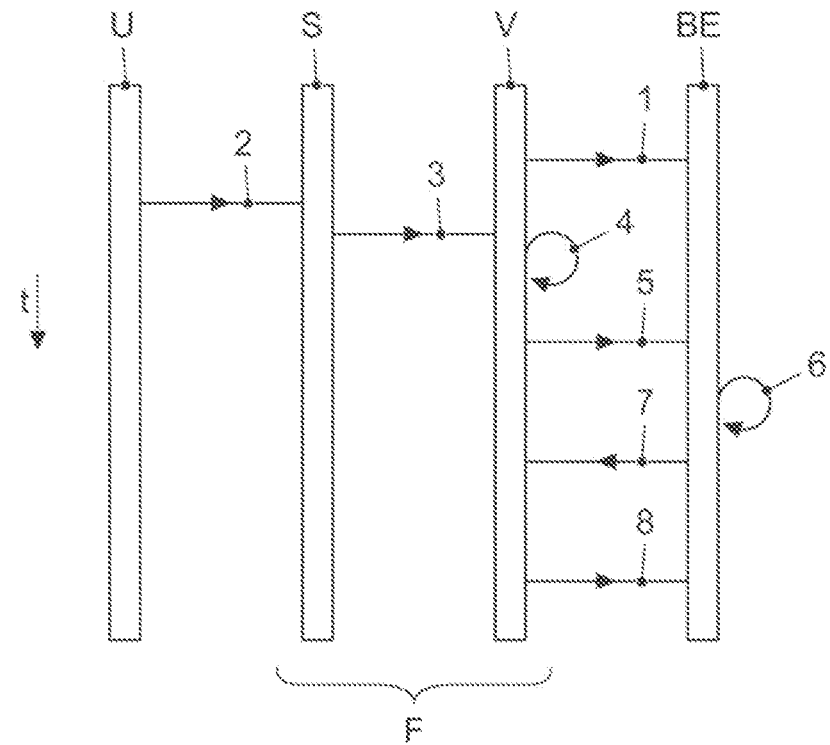

| | | | |
|---|---|---|---|
| 2013/0013348 A1 | 1/2013 | Ling et al. | |
| 2014/0330926 A1 | 11/2014 | Nano et al. | |
| 2014/0358412 A1* | 12/2014 | Fausten | G08G 1/16 |
| | | | 701/117 |
| 2015/0112730 A1* | 4/2015 | Binion | G06Q 40/08 |
| | | | 705/4 |
| 2016/0196132 A1 | 7/2016 | Searle et al. | |
| 2016/0232721 A1 | 8/2016 | Singh et al. | |
| 2017/0116566 A1 | 4/2017 | Walton | |
| 2017/0155696 A1 | 6/2017 | Dong et al. | |
| 2018/0173895 A1* | 6/2018 | Max | G06F 21/6254 |

FOREIGN PATENT DOCUMENTS

| | | |
|---|---|---|
| DE | 102016225287 A1 | 6/2018 |
| WO | 2013158467 A2 | 10/2013 |

\* cited by examiner

REQUESTING, ANALYZING AND TRANSMITTING DATA FROM DRIVER ASSISTANCE SYSTEMS ON A VEHICLE TO AN EXTERNAL USER

RELATED APPLICATIONS

The present application claims priority to International Pat. App. No. PCT/EP2019/0669977 to Max et al., filed Jun. 26, 2019, titled "Requesting, Analyzing and Transmitting Data from Drive Assistance Systems on a Vehicle to an External User", which claims priority to German Patent Application No. DE 10 2018 214 452.4 to Müller et al., filed Aug. 27, 2018, the contents of each being incorporated by reference in their entirety herein.

BACKGROUND

The present disclosure relates to a method for requesting, analyzing and transmitting data from a driver assistance system in a vehicle to an external user, and a corresponding device.

Numerous interactive electric serial systems have been developed for assisting drivers. The integrated assistance and comfort systems record the environment of the vehicle with diverse sensors in order to increase safety and comfort in driving the vehicle, and in this manner generate current data regarding the environment through which the vehicle is traveling.

Because the vehicles are already equipped with diverse sensor systems, it makes sense to collect this data and make use of it in an comprehensive manner. This trend is emphasized by two changes in fundamental conditions. First, previously optional systems are now standard due to the currently increasing safety requirements issued by the NCAP, for example. Second, because of the increase in electronic emergency call systems, also referred to as eCall, a cellular connection is now legally required in the vehicle. As a result, the environment data can be directly associated with a location and collected and communicated in a time-synchronized manner.

A variety of data classes are recorded in the vehicle itself. The data are classified with regard to the environment as follows:

Geo-information, relating to geographic phenomena relating directly or indirectly to a position on the earth,
Traffic data, i.e. a description of the states of all objects participating in traffic,
Site-specific event data, e.g. local hazardous areas occurring at specific locations, and
Site-specific status data, specifically continuously recordable data, e.g. temperature, parking area capacity, traffic light settings, variable traffic signs, etc.

More precisely, all environment data describing geographic phenomena directly or indirectly associated with a position on the earth are referred to as geo-information. These data are primarily recorded and made available by imaging sensors such as the front-end camera or the environment cameras on a vehicle.

Traffic data are understood according to the above summary as all data describing the movements of road users. These are traditionally the "floating car data, FCD," which describe the movement of the actual vehicle on the basis of GPS measurements. These data are supplemented with data from front and rear radars, or the front-end camera. As a result, the movement data of other road users can be classified and gauged, and provided as a data set.

The site-specific event data include all data that can be assigned to events that may occur spontaneously on the roadway and then disappear after a finite period of time. These data can be subdivided into events relating to the vehicle itself, and data that describe events in the environment. Examples of data that may relate to the vehicle itself are accidents, breakdowns, visibility obstructions, loss of traction, or construction sites, entrances and exits, potholes, people on the roadway, etc. that have been detected by the environment sensor system.

Site-specific status data include all statuses that can be continuously monitored. These include weather data for the climate control device, and rain/light sensors that measure:
temperature,
particulates,
air quality,
humidity,
rainfall,
brightness (infrared, normal visible light range), and
spray.

Parking area data are also included in the site-specific status data. A bilateral shape is generated by ultrasound sensors in this case, by means of which parking spaces, lateral objects, curbs, empty spaces, etc. can be detected.

Very precise maps, necessary for automatic driving, can be generated using these data. Furthermore, site-specific status data can be used to improve weather predictions, or warnings and recommendations for other road users can be generated.

US 2017/0155696 A1 relates to a preprocessing system for multi-level parallel buffers and context-based transmission of data that has a first data processing level and a second data processing level. The first data processing level comprises a buffer in the first level for buffering data from numerous raw data streams from numerous vehicles. The second data processing level comprises an electronic task queuing directory, (TQD module) and numerous data processing buffers in the second level. The TQD module generates numerous tasks in response to receiving serial data streams from the buffer in the first level. The TQD module also assigns a corresponding buffer in the second level to each task and separates the serial data streams into individual data streams that are sent to a buffer in the second level as a function of the tasks in order to thus generate a multi-level parallel context-based buffer mode.

US 2014/0330926 A1 relates to a method with which realtime data that are to be processed by one or more realtime analysis services are pre-processed. The method comprises the following steps:

receiving data from one or more client devices in a status-free input node,
transforming the data in realtime into status-free input nodes,
determining a realtime analysis service for the transformed data in the status-free input nodes in realtime, and
forwarding the transformed data in realtime to the determined realtime analysis service for status-associated processing.

The transmission of data regarding the environment of a vehicle to an external backend computer BE according to the so-called "pull" principle, as was the case previously, and shall be described below in reference to FIG. 1, has grave consequences. This results in a high query volume at the backend computers, and the data must be stored for a long time in the vehicle. Furthermore, all of the transmitted data must be anonymized, leading either to a significantly higher latency of the cycle, or to potentially undesired data requests in the case of undesired queries resulting from the veiled position.

SUMMARY

Some aspects of the present disclosure is therefore to create an efficient method for transmitting data from the driver assistance system, DAS data, to an external backend computer for analysis of the swarm data formed from the DAS data, and a corresponding device.

In some examples, a method is disclosed for requesting, analyzing and transmitting data from the driver assistance system in a vehicle, hereinafter referred to as DAS data, to an external user. The method may include the steps of determining DAS data by the sensor system for the driver assistance system in the vehicle; storing the DAS data in a swarm data aggregator in the vehicle, wherein the DAS data in the swarm data aggregator have a decay period; summarizing the DAS data stored in the swarm data aggregator; transmitting the summary of the DAS data to a swarm memory in an external backend computer, analysis of the summary of the DAS data by an analysis device in the backend computer; requesting the DAS data stored in the swarm data aggregator by the analysis device if the analysis of the summary indicates that there are relevant DAS data in the swarm data aggregator; transmitting the DAS data from the swarm data aggregator in the vehicle to the swarm memory in the backend computer in response to the request; and transmitting the DAS data from the swarm memory to the external user for further use.

In some examples, a device is disclosed for requesting, analyzing, and transmitting data from the driver assistance system in a vehicle, so-called DAS data, to an external user, wherein the device designed and configured to execute the method described herein comprises: a sensor system in the vehicle for the driver assistance system for generating DAS data; a swarm data aggregator in the vehicle for temporary storage of the recorded DAS data; an external backend computer with a swarm memory for storing the DAS data generated in the vehicle; a user that analyzes selected DAS data; and an analysis device located in the backend computer comprising an analysis algorithm, wherein the swarm data aggregator creates a summary of the temporarily stored DAS data, the summary by the swarm data aggregator is sent to the swarm memory in the external backend computer, and the summary is analyzed by the analysis device using the analysis algorithm, the DAS data stored in the swarm data aggregator are requested by the analysis device if the analysis of the summary shows that the swarm data aggregator contains relevant DAS data, the DAS data from the swarm data aggregator in the vehicle are sent to the swarm memory in the backend computer in response to the request, and the DAS data from the swarm memory are sent to the external user.

BREIF DESCRIPTION OF THE DRAWINGS

Figure 2:
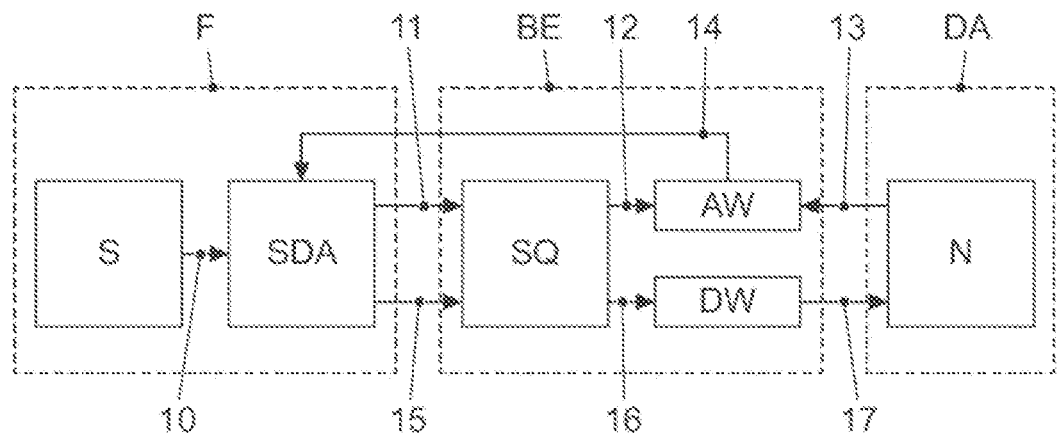

A data transfer according to the pull principle and a preferred embodiment of the present disclosure shall be explained below in reference to the drawings. Therein:

FIG. 1 shows the transmission of data from a vehicle to an external user according to the pull principle (prior art); and FIG. 2 shows the transmission of data from a vehicle to an external user according to the swarm data principle under some aspects of the present disclosure.

DETAILED DESCRIPTION

The technologies and techniques disclosed herein are configured to provide a lower data transfer volume than with known methods according to the pull principle, because DAS data are only transmitted if they are actually needed. This also results in a quick reaction time, because the data request is triggered by the analysis device in the case of a positive analysis of the summary.

In some examples, the DAS data stored in the swarm memory may be anonymized by means of a transmission and anonymization device, and forwarded to the external user in the anonymized form. The DAS data transmitted to the user can be anonymized by temporal and/or spatial distortion. In particular, the type of distortion used for the anonymization can be a function of the DAS data.

If it is necessary to know the time at which the DAS data are generated, e.g. in the case of weather data or road conditions resulting from snow, ice or moisture, the anonymization can be obtained through a spatial imprecision, i.e. spatial distortion. If the time at which the DAS data are obtained is not important, but the location is, a temporal veiling can take place. There are also other methods for veiling the personal data of the DAS data.

The analysis of the summary of the temporary DAS data stored in the swarm data aggregator by the analysis device is more preferably based on an analysis algorithm that can be parameterized. These parameters for the analysis algorithm are preferably set by the user in this case, and then sent to the analysis device for use in the analysis algorithm. This allows for flexibility in the analysis algorithm.

The parameters provided by the user for the analysis algorithm may be configured as a function of the data analysis of the DAS data provided by the user. In other words, the user determines which DAS data are necessary for the evaluation and analysis. These parameters can be, e.g., a spatial and/or temporal, or other type of selection with regard to the DAS data.

The parameters may be transmitted from the user to the analysis device in a predetermined temporal cycle. This cycle can recur, e.g., on an hourly, daily, or weekly basis.

There is preferably a transmission and anonymization device in the backend computer that anonymizes the DAS data sent to the swarm memory upon request by the analysis device, and transmits the anonymized data to the user.

The swarm data aggregator in the vehicle is also preferably formed by a circular buffer, such that the data are deleted after a predefined time has elapsed.

FIG. 1 shows the transmission of data regarding the environment of a vehicle to an external backend computer BE according to the so-called pull principle, as is currently the practice. The relevant elements in this case are shown as vertical bars in FIG. 1, wherein the time t runs from the top downward, as indicated by the arrow t. The first bar represents the environment U, the second bar represents the sensor system S, including the position determination of a vehicle F, the third bar represents the upload V of the DAS data, and the fourth bar represents the backend computer BE. The sensor system S and the upload V are located in the vehicle F.

The external backend computer BE sends a request 1 for DAS data to the upload V in the vehicle F in the first step, wherein DAS data represent environment data generated by the sensor system S in the vehicle assistance system, including GPS position data. The DAS data requested in the request 1 are generated by the continuous effects 2 on the sensor system S in the vehicle F by the environment, and the DAS data are continuously transmitted 3 to the upload V, in which the DAS data are stored and kept available in a circular buffer 4. In response to the request 1 by the backend computer BE, the upload V first transmits 5 the GPS position data for the vehicle from the circular buffer 4. The backend computer BE then checks 6 whether there is a need for DAS data regarding the position of the vehicle F determined by the GPS data based on the GPS data that have been transmitted. If the results of the check 6 are positive, the upload V is notified 7 of a need for the DAS data, thus triggering transmission 8 of the requested DAS data from the circular buffer 6 to the backend computer BE.

The sequence described above in reference to FIG. 1 has three substantial disadvantages:

High Request Volumes:
  The vehicle F continuously informs the backend computer BE of its position through a transmission procedure. If this is only needed for 1% of the cases, 99% of the requests must be evaluated needlessly. This leads to high costs on the part of the backend computer BE.

Low Speed:
  By forwarding the DAS data to the backend computer BE, the time required for the respective data to be transmitted and analyzed by the backend computer BE is increased. This means that the data must be stored longer in the vehicle F, depending on the latency, resulting in higher product related costs for the vehicle F.

Problem Area Data Protection
  If personal data, e.g. GPS data, are forwarded to the backend computer, they must be anonymized prior to output, which can be achieved, e.g., through spatial or temporal veiling of the DAS data. This results in either a significantly higher latency of the cycle in the case of a temporal delay, or potentially undesired data requests in the case of undesired queries through veiled positions.

The third point in particular makes the development of such a sequence according to the pull principle particularly difficult.

FIG. 2 shows the integration of an analysis device AW in the backend computer BE, which is controlled in a targeted manner through suitable parameters, by means of which the disadvantages of the pull principle specified above in reference to FIG. 1 can be minimized or eliminated.

A sensor system S is located in a vehicle F, analogous to FIG. 1, which, in addition to recording the data regarding the environment, not shown in FIG. 2, also detects the position of the vehicle F by means of a GPS system (not shown), which are normally referred to as DAS data, i.e. data obtained by the sensor system in the driver assistance system. The DAS data obtained by the vehicle sensors in the sensor system S are sent in a transmission 10 to a swarm data aggregator SDA, and stored therein, wherein the swarm data aggregator SDA, in addition to storing the DAS data, also summarizes the stored DAS data. Furthermore, the DAS data stored in the swarm data aggregator SDA have a decay time, which means that the DAS data are deleted after the decay time has elapsed. For this reason, the swarm data memory SDA is normally a circular buffer.

The contents of the summary may be configured to include three groups of information:

A first group A relates to the available information and therefore contains an overview of the available sensors in the vehicle.

Another group B relates to information regarding where and when. In other words, this group relates, e.g., to rough position and movement data, time stamps, information regarding the current streets on which the vehicle is located, e.g., an urban street, highway, rural road, etc.

The third group C relates to information regarding the probable quality of the signals, e.g., status data for the sensor system in use; in other words, no detected errors, no disruptive influences, selective comparison of sensors, measurement data regarding potentially disruptive environmental effects, etc.

In general, depending on the use as a summary, a selection of the groups A, B, and/or C specified above can be transmitted.

The swarm data aggregator SDA located in the vehicle F triggers a transmission 11 of the summary of the DAS data to a swarm memory SQ in the external backend computer BE. Instead of transmitting all of the data, only a summary of the DAS data stored in the swarm data aggregator may be sent to the backend computer BE and stored in the swarm memory SQ.

The summary of the DAS data stored in the swarm data memory SQ may be sent to an analysis device AW (also referred to a an analytic worker) in the backend computer BE via a transmission 12 and analyzed for relevant data in the analysis device AW with a suitable algorithm. The analysis algorithm is provided by a user N, which is a component of the data analysis DA, also referred to as Data Analytics, and is set by parameters for the data analysis DA, wherein the parameters for the analysis algorithm are sent to the analysis device AW via a transmission 13. These parameters for the analysis algorithm can then be sent in a predefined cycle, e.g., daily or weekly, to the analysis device via the transmission 13.

If the analysis device AW identifies relevant data in the summary of the swarm memory SQ on the basis of its parameterized algorithm, then the analysis device AW triggers a so-called "data pull" without delay, e.g., a request 14 to transfer 15 the DAS data from the swarm data aggregator SDA in the vehicle F to the swarm memory SQ in the backend computer BE. All of the DAS data now located in the swarm data memory SQ in the backend computer BE are then sent to a transmission and anonymization device DW via an input 1, also referred to as a "dispatcher worker," in which they are processed by means of an anonymization filter and then provided to the user N via a transfer 17.

The parameterization and the analysis algorithm in the analysis device AW shall be described below based on a simplified example in which parking space data are selected, wherein the analysis device AW subjects the summary to the following check, described in terms of keywords:

is a parking space sensor system incorporated in the vehicle F?
  checking the GPS position of the vehicle F to determine if it is within the area of a predefined city, e.g. Munich?
  is the time of day between 6:00 AM and 9:00 PM?
  is the speed of the vehicle less than 70 km/h? (70 km/h is the sensor limit for the parking sensors, such that measurements higher than 70 km/h cannot be used).
  is the vehicle on a street on which there are probably parking spaces?
  are the sensors functioning properly, or has an error been detected?

In this example, if all of the questions are answered with "yes," the analysis device requests the corresponding DAS data from the summary.

Parameters can also be derived from the above questions that have an effect on the analysis algorithm in the analysis device AW in this example. These include, but are not limited to:

the GPS position is within a city, e.g. Munich. Munich is specified by the user N in the example.

the time period of interest is specified by the user N.

a speed limit is defined as a parameter, e.g. if the intended speed of the vehicle is less than 70 km/h.

a type of street is defined on which parking spaces are likely to be found.

quality criteria regarding the sensors are defined; it is required that the sensors are functioning properly, or no errors have been detected.

The anonymization filter in the transmission and anonymization device DW converts the personal data into group-focused data. This can take place by adding distortion to the position of the vehicle, e.g., generating an imprecise position, in which the position of the vehicle is output with a precision, e.g., of ±500 m, such that numerous potential vehicles could have carried out this measurement.

If neither time nor space, or any other possibility for veiling, function, the data can be provided without being anonymized. In this case, either a special acquiescence is required from the owner of the vehicle, or no use is made thereof.

A method or device explained in reference to FIG. 2 has the following advantages:

Lower Data Transfer Volumes:

the analytics worker only rarely needs to be parameterized, and only that data needed by the user are transmitted.

Quick Reaction Time:

the data transmission of the complete DAS data can be immediately triggered with the data have been identified. A potential delay caused by forwarding the data or possible veiling is not necessary.

Optimized Data Protection:

because the data that are necessary for the data request no longer leave the backend computer BE, the data protection provisions also apply to the backend computer. Provisions regarding a potential forwarding of the data according to the prior art can be eliminated.

LIST OF REFERENCE SYMBOLS

U environment
S sensor system, including position sensors
V recording/uploading the DAS data in the vehicle
BE backend computer
F vehicle
t time
N user
SDA swarm data aggregator
SQ swarm memory
AW analysis device
DW transmission and anonymization device
DA data analysis
1 requesting DAS data (driver assistance system data)
2 effects on the vehicle sensor system by the environment (continuous)
3 continuous transmission of the DAS data to the upload
4 storing the DAS data in a circular buffer
5 cyclical transmission of the GPS position data to the user
6 checking the GPS position data for relevance
7 request sent for DAS data
8 transmission of the DAS data from the circular buffer according to need
10 transmitting DAS data
11 transmitting the summary of the DAS data
12 transmitting the summary to the analysis device
13 determining the analysis parameters
14 requesting the DAS data
15 transmitting the DAS data to the swarm memory
16 transmitting the DAS data to the transmission and anonymization device
17 transmitting the anonymized DAS data to the user in the data analysis

The invention claimed is:

1. A method for processing data from a driver assistance system (DAS) in a vehicle, comprising:
receiving DAS data via a sensor system;
storing the DAS data in a swarm data aggregator (SDA) in the vehicle, wherein the DAS data are provided with a decay time in the SDA;
generating a summary of the DAS data stored in the SDA;
transmitting the summary of the DAS data to a swarm memory in an external backend computer to determine if the summary includes configured DAS data in the summary;
requesting, via an analysis device, the DAS data stored in the swarm data aggregator if the summary includes the configured DAS data; and
transmitting the DAS data from the SDA in the vehicle to the swarm memory in the external backend computer for further transmission to an external user.

2. The method according to claim 1, wherein the transmitted DAS data is anonymized using a transmission and anonymization device.

3. The method according to claim 2, wherein the anonymization of the transmitted DAS data comprises distorting the DAS data using temporal and/or spatial distortion.

4. The method according to claim 3, wherein the temporal and/or spatial distortion comprises a function of the transmitted DAS data.

5. The method according to claim 1, wherein the determining if the summary includes configured DAS data in the summary comprises applying a parameterized analysis algorithm.

6. The method according to claim 5, wherein parameters for the parameterized analysis algorithm are received from the external user in the analysis device.

7. The method according to claim 5, wherein parameters for the parameterized analysis algorithm are a function of data analysis of the DAS data provided by the external user.

8. The method according to claim 5, wherein parameters for the parameterized analysis algorithm are received in a predefined temporal cycle in the analysis device.

9. A system for processing data from a driver assistance system (DAS) in a vehicle, comprising:
a vehicle sensor system for generating DAS data;
a swarm data aggregator (SDA) for storing the generated DAS data; and
a backend computer comprising a swarm memory for storing the generated DAS data from the vehicle sensor system, and an analysis device configured to execute an analysis algorithm, wherein the SDA and the backend computer are configured to
generate, via the SDA, a summary of the generated DAS data stored in the SDA, wherein the summary of the generated DAS data is transmitted to the swarm memory in the backend computer to determine, via the analysis algorithm, if the summary includes configured DAS data, request, via the analysis device, the generated DAS data stored in the SDA if analysis of the summary indicates that the configured DAS data is contained in the SDA, transmit the generated DAS data from the SDA to the swarm memory in response to the request, and transmit the generated DAS data from the swarm memory to an external user.

10. The system according to claim 9, further comprising a transmission and anonymization device for anonymizing the generated DAS data transmitted from the SDA to the swarm memory.

11. The system according to claim 10, wherein the transmission and anonymization device is configured to anonymize the generated DAS data transmitted from the SDA to the swarm memory by distorting the generated DAS data using temporal and/or spatial distortion.

12. The system according to claim 11, wherein the temporal and/or spatial distortion comprises a function of the generated DAS data.

13. The system according to claim 9, wherein the determining if the summary includes configured DAS data in the summary comprises applying a parameterized analysis algorithm.

14. The system according to claim 13, wherein parameters for the parameterized analysis algorithm are received from the external user in the analysis device.

15. The system according to claim 13, wherein parameters for the parameterized analysis algorithm are a function of data analysis of the generated DAS data provided by the external user.

16. The system according to claim 13, wherein parameters for the parameterized analysis algorithm are received in a predefined temporal cycle in the analysis device.

17. The system according to claim 9, wherein the SDA is formed by a circular buffer.

18. A method for processing data from a driver assistance system (DAS) in a vehicle, comprising:

receiving DAS data via a sensor system;

storing the DAS data in a swarm data aggregator (SDA) in the vehicle, wherein the DAS data are provided with a decay time in the SDA;

generating a summary of the DAS data stored in the SDA;

transmitting the summary of the DAS data to a swarm memory in an external backend computer to determine if the summary includes configured DAS data in the summary;

requesting, via an analysis device, the DAS data stored in the swarm data aggregator if the summary includes the configured DAS data;

anonymizing the DAS data by distorting the DAS data using temporal and/or spatial distortion; and transmitting the DAS data from the SDA in the vehicle to the swarm memory in the external backend computer for further transmission to an external user.

19. The method according to claim 18, wherein the temporal and/or spatial distortion comprises a function of the DAS data.

20. The method according to claim 18, wherein the determining if the summary includes configured DAS data in the summary comprises applying a parameterized analysis algorithm.

* * * * *